(12) United States Patent
Saint-Jalmes et al.

(10) Patent No.: US 7,517,010 B2
(45) Date of Patent: Apr. 14, 2009

(54) CONVERTIBLE AIRCRAFT SEAT COMPRISING MOVABLE ARMRESTS

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 10/573,475

(22) PCT Filed: Sep. 27, 2004

(86) PCT No.: PCT/FR2004/002442

§ 371 (c)(1),
(2), (4) Date: Feb. 21, 2007

(87) PCT Pub. No.: WO2005/030580

PCT Pub. Date: Apr. 7, 2005

(65) Prior Publication Data

US 2007/0210209 A1    Sep. 13, 2007

(30) Foreign Application Priority Data

Sep. 26, 2003    (FR) .................................. 03 11330

(51) Int. Cl.
*B60N 2/34* (2006.01)
*B60N 2/46* (2006.01)
*B64D 11/00* (2006.01)
*B64D 11/06* (2006.01)

(52) U.S. Cl. ............. 297/118; 297/354.13; 297/411.36; 244/118.5; 244/118.6; 244/122 R

(58) Field of Classification Search ................. 297/118, 297/354.13, 411.36; 244/118.5, 118.6, 122 R
See application file for complete search history.

(56) References Cited

U.S. PATENT DOCUMENTS

| | | | | |
|---|---|---|---|---|
| 2,514,798 A | | 7/1950 | Rowe | |
| 5,857,745 A | * | 1/1999 | Matsumiya | 297/118 X |
| 5,954,401 A | * | 9/1999 | Koch et al. | 297/354.13 |
| 5,992,798 A | * | 11/1999 | Ferry | 244/118.6 |
| 6,059,364 A | * | 5/2000 | Dryburgh et al. | 297/354.13 |
| 6,113,183 A | * | 9/2000 | Koch et al. | 297/184.14 |
| 6,119,980 A | * | 9/2000 | Ferry | 244/122 R |
| 6,170,786 B1 | * | 1/2001 | Park et al. | 297/188.16 X |
| 6,173,921 B1 | * | 1/2001 | Neumann et al. | 244/118.6 |
| 6,209,956 B1 | * | 4/2001 | Dryburgh et al. | 297/354.13 X |
| 6,276,635 B1 | * | 8/2001 | Ferry et al. | 244/118.6 |
| 6,305,644 B1 | * | 10/2001 | Beroth | 297/354.13 X |
| 6,352,309 B1 | * | 3/2002 | Beroth | 297/354.13 X |
| 6,494,536 B2 | * | 12/2002 | Plant | 297/354.13 X |
| 6,692,069 B2 | * | 2/2004 | Beroth et al. | 297/118 |
| 6,742,842 B2 | * | 6/2004 | Dowty | 297/354.13 |
| 6,846,042 B2 | * | 1/2005 | Hanson et al. | 297/411.36 |

(Continued)

FOREIGN PATENT DOCUMENTS

EP         0 869 060         10/1998

(Continued)

*Primary Examiner*—Rodney B. White
(74) *Attorney, Agent, or Firm*—Oblon, Spivak, McClelland, Maier & Neustadt, P.C.

(57) ABSTRACT

A seat for an aircraft includes a seating surface, a backrest and two armrests. The seat also includes a mechanism for guiding at least one of the armrests in translation in an essentially-vertical direction.

17 Claims, 3 Drawing Sheets

U.S. PATENT DOCUMENTS

Figure 1:
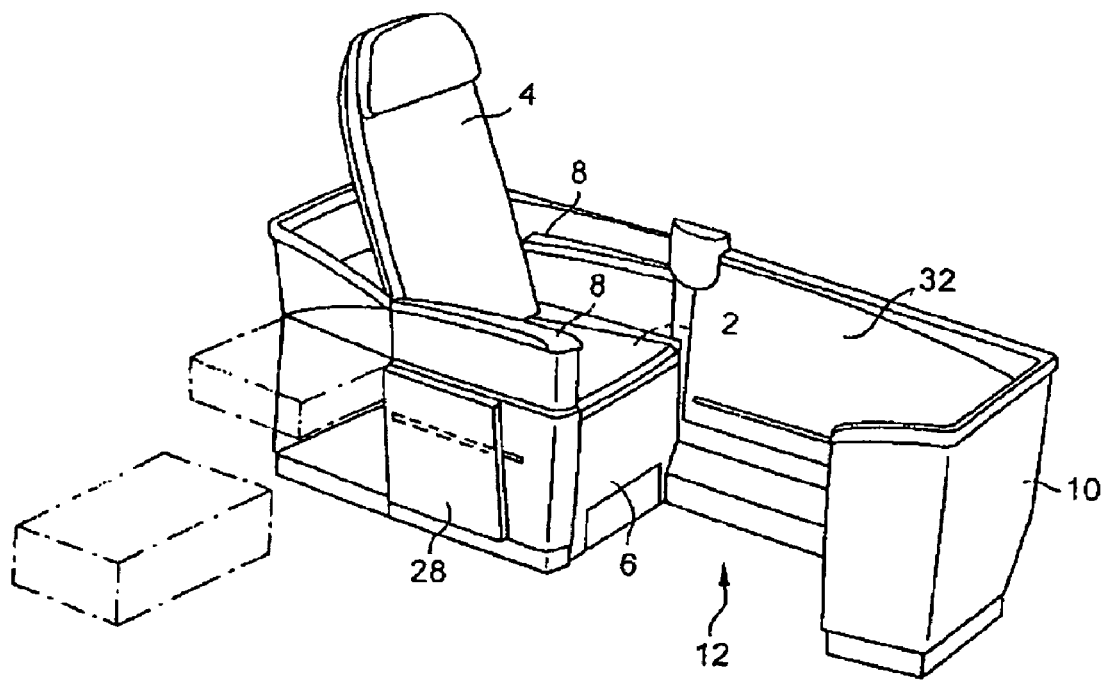

| | | | |
|---|---|---|---|
| 7,178,871 B1 * | 2/2007 | Round et al. | 297/354.13 X |
| 7,188,806 B2 * | 3/2007 | Beroth | 244/122 R |
| 7,318,622 B2 * | 1/2008 | Rezag et al. | 297/118 |
| 7,360,742 B2 * | 4/2008 | Beroth | 244/118.5 |
| 7,419,214 B2 * | 9/2008 | Plant | 244/118.6 X |
| 2001/0015566 A1 * | 8/2001 | Park et al. | 297/115 |
| 2003/0085597 A1 * | 5/2003 | Ludeke et al. | 297/354.13 X |

FOREIGN PATENT DOCUMENTS

| | | |
|---|---|---|
| GB | 2 362 095 | 11/2001 |
| WO | 03/013903 | 2/2003 |

* cited by examiner

CONVERTIBLE AIRCRAFT SEAT COMPRISING MOVABLE ARMRESTS

This invention relates to an aircraft seat with movable armrests. It relates more particularly, but not exclusively, to such a seat intended to be surrounded by a wall delimiting the space around the seat intended for the individual traveling in this seat.

In aircraft intended to make long-distance trips, several comfort classes generally are offered to the passengers. One type of seat generally corresponds to each comfort class. For the highest comfort class, seats convertible into a bed generally are provided. Travelers occupying these seats therefore can sleep in a lying-down position.

In the area of passenger transportation, the airline companies wish to optimize the available space aboard an aircraft in the so-called economy spaces as well as in the spaces usually referred to as first class. In the latter spaces, it is appropriate to offer great comfort to the passengers, in particular allowing them to sleep in lying-down position.

This invention has as its purpose to provide greater comfort for a given convertible seat width.

This invention was realized on the basis of the following observation: the armrests of a seat are useful only when the seat is in a so-called seated position. The width of a seat generally corresponds to the width of its sitting portion increased by the width of the armrests. In lying-down position, a traveler generally has the use only of the width of the sitting portion. The idea at the base of the invention is to make the armrests also contribute to the comfort of the passenger in lying-down position.

In the documents of the prior art, there are convertible seats having fixed armrests, that is, not shifting when the seat changes from its seated position to its lying-down position. This is the case, for example, for the seats disclosed by the documents WO-96/18537 or WO-00/21831.

In the document EP-1 116 654, the figures show an armrest that pivots when the seat changes from its seated position to its inclined position.

As regards this invention, it proposes a seat intended for an aircraft, comprising a sitting portion, a back and two armrests, this seat being convertible into a bed. According to the invention, such a seat is characterized in that it further comprises means for guiding at least one armrest in a translatory movement in a more or less vertical direction, and in that each armrest is movable between an initial position in which it projects above the surface of the sitting portion and a second retracted position in which it is more or less flush with the surface of the adjacent more or less horizontal portion of the seat or is below this more or less horizontal portion.

In this way, the armrests can be retracted, thus freeing up space for the passenger using the seat. The armrests in the seated position of the seat can serve their primary function, that is, to act as support for the elbows and forearms of a passenger. When the seat subsequently is converted into a bed, the armrests do not limit the width of the bedding surface. In the case in which the armrests become flush with the bedding surface, they then are integrated therein and the bedding surface thus is enlarged, therefore allowing an appreciable improvement in passenger comfort.

The armrests also can be retracted when the seat is in its seated position. The passenger then, for example, can sit in a position pivoted about 90° in relation to the normal direction of movement.

The surface of the more or less horizontal portion of the seat adjacent to the armrest can correspond, for example, to the surface of the back of the seat when the latter is in a more or less horizontal position. The surface of the sitting portion of the seat also can be involved.

The passenger thus enjoys more space at the trunk level than in the case in which the armrests remain fixed. All, or almost all, of the width of the seat then is used, in the seated position of the seat as well as in its lying-down position.

In order to simplify the structure of the seat, it is advantageous that the movement of the armrest be independent of the movement of the back. No coupling between these two elements (armrest and back) then is necessary, thus making it possible to have a simplified and therefore also streamlined structure.

A seat according to the invention also can comprise, for example, a lateral wall surrounding, in particular, the rear of the seat. In this case, in order to save space, one armrest advantageously is in the extension of the wall.

In order to provide for guidance of the armrest, the guidance means comprise, for example, at least two more or less vertical rails. The latter can be at the two ends of the armrest or else along a lateral surface thereof.

For its maintenance in high position, each movable armrest advantageously comprises means for locking in its high position.

A simple and reliable technical solution provides that the seat comprises prestressing means exerting a force on the armrest tending to restore it to its high position. The mechanism therefore can be simplified, since the return to high position is provided for by the prestressing means. It then can be provided that the movable armrests descend by means of a pressure exerted by the passenger. The effort to be exerted is limited especially since the passenger easily can use his weight to help him.

In the latter embodiment, there also advantageously are provided means for locking the armrest in its low position so as to maintain same in this position and prevent the prestressing means from raising it.

This invention also relates to an aircraft intended for passenger transportation, characterized in that it comprises at least one seat such as described above.

Figure 2:
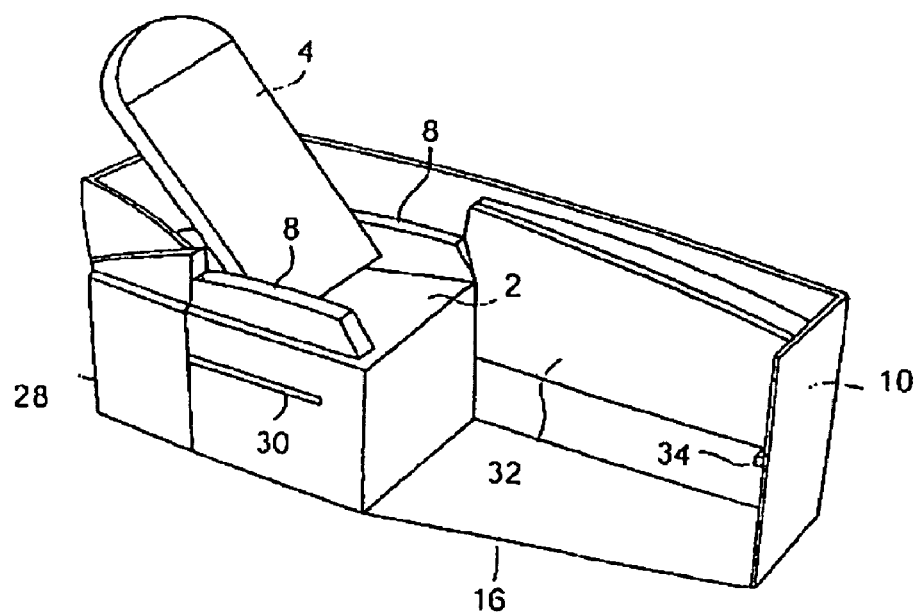
Figure 3:
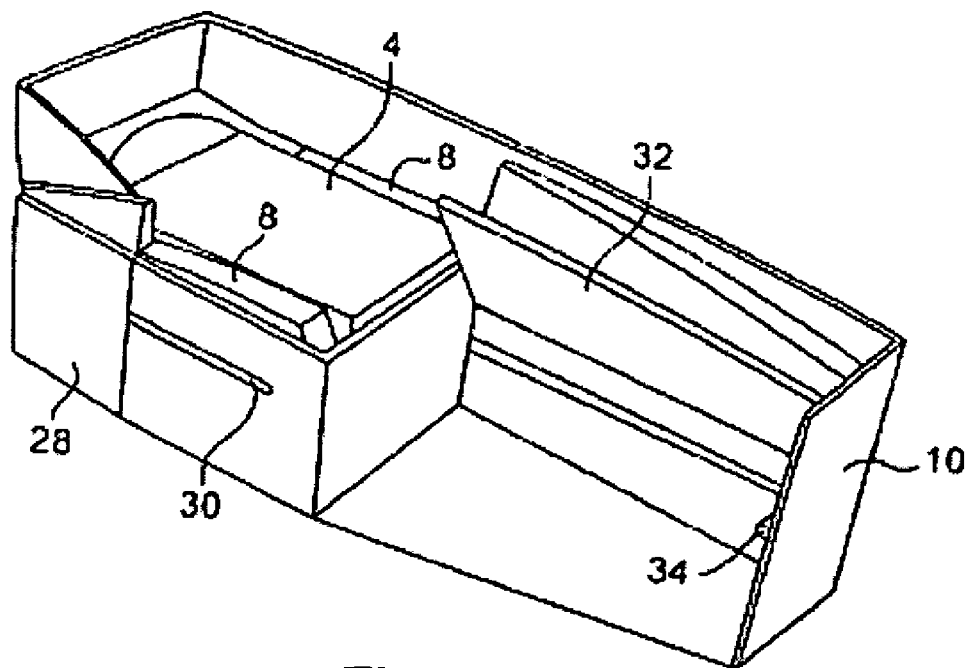
Figure 4:
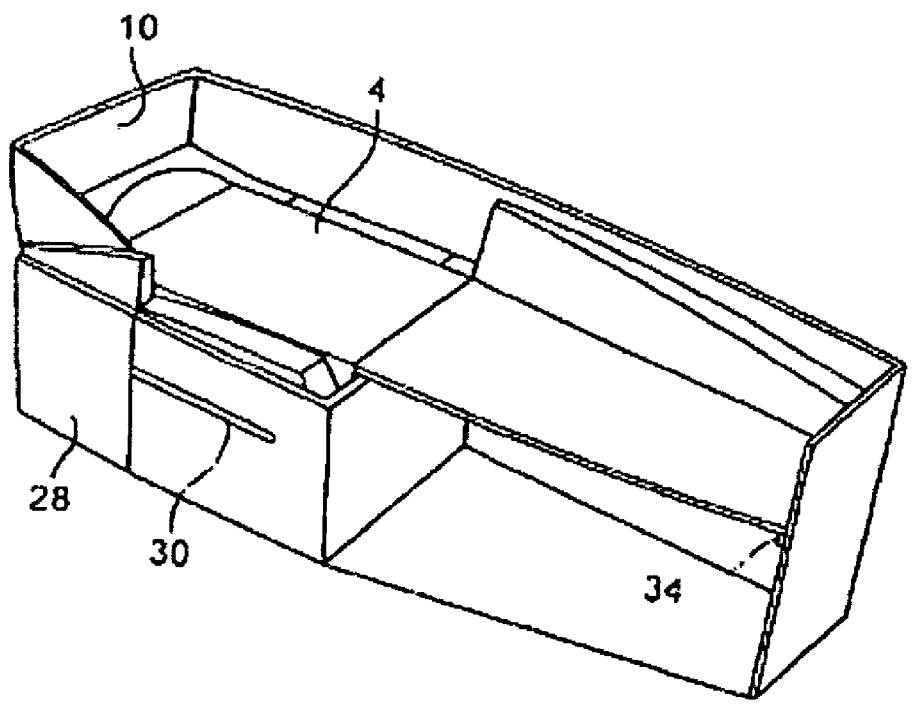
Figure 5:
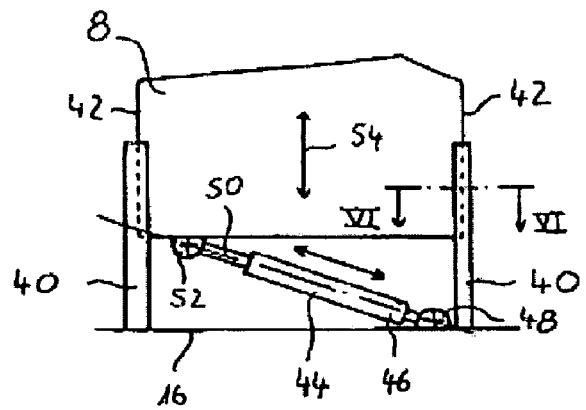
Figure 6:
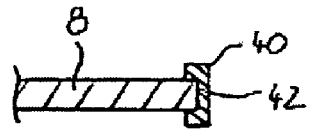
Figure 7:
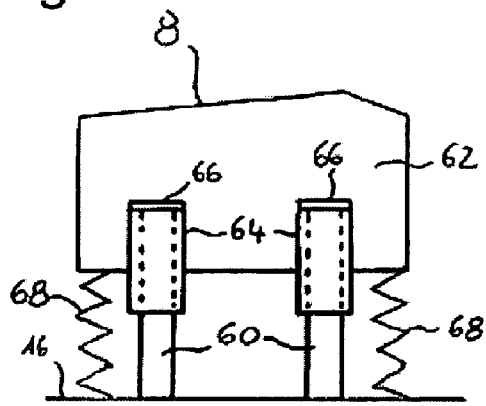
Figure 8:
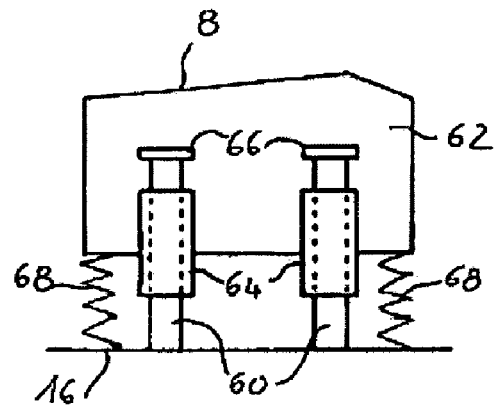
Figure 9:
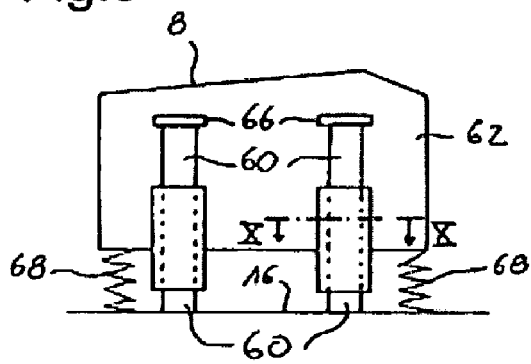
Figure 10:
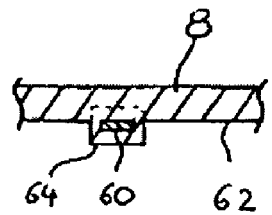

Details and advantages of this invention will become more apparent from the description that follows, given with reference to the attached schematic drawing, in which:

FIG. 1 depicts a seat according to the invention for accommodating a passenger in seated position, FIG. 2 shows a seat of the same type as the one in FIG. 1 in a position intermediate between its so-called seated position and its so-called lying-down position, FIG. 3 shows the seat of FIG. 2 in another intermediate position, the armrests being in descended position, FIG. 4 shows the seat of FIG. 3 converted into a bed, FIG. 5 schematically shows an armrest of the seat of FIGS. 2 to 4 as well as the corresponding mechanism, FIG. 6 is a view in cross-section of the sectional line VI-VI of FIG. 5, FIGS. 7 to 9 depict an armrest equipped with another translatory mechanism, each of the views showing this armrest in a different position, and FIG. 10 is a view in cross-section of the sectional line X-X of FIG. 9.

FIG. 1 shows a first embodiment of a seat according to the invention. This seat comprises a sitting portion 2, a back 4 and a footrest 6. On either side of the sitting portion 2 there is also, in each instance, an armrest 8.

This seat is intended to accommodate an aircraft passenger and to be fastened to the floor of an aircraft cabin. This seat more particularly is intended for a first-class compartment of an aircraft or else possibly for a business-class compartment.

Then in order effectively to delimit the space given to the passenger traveling in this seat, a wall 10 comes to surround this space. The seat is, of course, inside this space, and an opening 12 implemented in the wall 10 permits access to the interior of this space and to the seat. This wall 10 has, for example, a height of about 80 cm that corresponds more or less to the height of the armrests 8 in their raised position. Thus, an individual seated in the seat can converse with a neighboring individual and be relatively well isolated from the other travelers when the seat is converted into a bed. Nonetheless, a different height, of course, can be chosen for the wall 10.

FIG. 1 shows the seat in a so-called seated position in which it is intended to accommodate a passenger traveling in seated position. FIGS. 2 and 3 show intermediate positions of the seat of FIG. 1 before reaching the so-called lying-down position depicted in FIG. 4. In the latter position, the seat has a more or less level bedding surface intended to accommodate a passenger in lying-down position.

In the embodiment of the seat depicted in the drawing, to change from the seated configuration (FIG. 1) to the lying-down configuration (FIG. 4), the sitting portion 2 of the seat remains fixed. Only the back shifts from its more or less vertical position of FIG. 1 to its more or less horizontal position of FIGS. 3 and 4. The base of the back, that is, the portion of the back 4 located close to the sitting portion 2, is translated from one edge to the other of the sitting portion 2. In the seated position, the base of the back 4 is more or less above the transverse rear edge of the sitting portion 2, while in its more or less horizontal position of FIG. 4, this base of the back 4 is more or less above the front transverse edge of the sitting portion 2.

The movement of the back 4 is independent of the movement of the armrests 8. These elements are totally independent of one another. Thus an armrest 8 can be acted upon without causing the back 4 to move and vice versa.

It is noted in FIGS. 1 to 4 that the movement of the back 4 also takes place without being hindered by the wall 10. The fixed sitting portion 2 and the wall 10 are arranged one in relation to the other so that in the more or less horizontal lying-down position of the back 4, on the one hand the headrest is close—at most a few centimeters away—to the wall 10, and on the other hand, the base of the back is more or less above the transverse front edge of the sitting portion 2.

Given that the height of the back 4 is greater than the length of the sitting portion 2, when the conditions of the preceding paragraph are met, a space now remains between the base of the seat (which also can be referred to as "frame" and which is underneath the sitting portion 2) and the wall 10. This space advantageously can be turned to good account for the storage of baggage. Thus there is noted in FIGS. 1 to 4 the presence of a sliding door 28 on the wall 10, arranged at the level of the floor 16 of the cabin and at the rear of the seat, to permit access to and closing of this storage space. A horizontal guiding rail 30, for example, is provided in the wall 10 to permit sliding of this door 28.

The presence of such storage space behind the seat is very advantageous. As a matter of fact, the storage volume thus made available is greater than the volume customarily provided per passenger in an aircraft cabin. In addition, this arrangement of a baggage bin behind the seat and on the floor 16 entails almost no additional weight as is the case when baggage bins are arranged overhead in an aircraft cabin.

The changeover of the back 4 to horizontal does not make it possible to accommodate a passenger in lying-down position. Supplementary means then are provided to cooperate with the back 4 in horizontal position in order to create a bedding surface capable of comfortably accommodating a man in lying-down position. FIGS. 3 and 4 show these supplementary means and illustrate the implementation thereof.

An additional berth 32 is provided inside the wall 10. When a passenger is traveling seated in the seat, this additional berth 32 is stored vertically along the wall 10, inside the latter, in front of the frame. This additional berth 32 has a level surface complementary to the surface of the back 4 to form a full berth capable of accommodating a passenger.

This additional berth 32 might be simply an element independent of the rest of the seat and of the wall 10 that might be held, for example, with the aid of webbing when it is stored vertically along the wall 10 and that might come to be detached to place it in horizontal position in order to cooperate with the back horizontally to form a berth.

It is preferable, however, to provide guiding means facilitating the changeover of the additional berth 32 from its vertical stored position to its horizontal "service" position. Thus, for example, a more or less horizontal shaft can be provided at the bottom of the additional berth 32 when the latter is in vertical stored position along the wall. This shaft then engages in a more or less vertical guiding groove on the one hand on the side of the seat, for example the groove may be implemented on a front holdfast of the frame, and on the other hand on the side of the wall 10 opposite the seat. Then when the shaft of the additional berth 32 reaches a stop in high position, or else even in the course of movement of this shaft in the corresponding grooves, the additional berth 32 is pivoted (cf. FIG. 3) to assume a horizontal position (cf. FIG. 4). This additional berth 32 is maintained in this horizontal position by resting on the front transverse edge of the sitting portion 2 as well as on a flange 34 implemented on the inner surface of the wall 10 opposite the seat.

In standard manner, the seat according to the invention also can comprise a footrest 6 as in the embodiment depicted in FIG. 1. This footrest 6 can be tilted, for example, to support the legs of a passenger traveling in seated position and to increase his comfort. Such a footrest is not described in greater detail here because on the one hand it is known to the individual skilled in the trade, and on the other hand, in this described embodiment, it does not contribute to the transformation of the depicted armchair into a berth.

It is noted in FIGS. 3 and 4 that the armrests 8 are in a lowered position in relation to the position of FIG. 1. In this way, the passenger traveling lying down is not made uncomfortable at the level of these armrests 8 which therefore also can be used to increase the bedding surface.

FIGS. 5 and 6 illustrate the downward movement of an armrest 8. The latter is guided by two vertical rails 40. In the embodiment of FIGS. 5 and 6, these rails are sectional rails having a U section. A vertical edge 42 of the armrest 8 then becomes positioned between the branches of each sectional rail 40. For better sliding, ball bearings (not depicted) can be provided in each rail 40.

A jack 44 controls the vertical translatory movement of the armrest 8. This jack 44 is mounted at an angle. It comprises a body 46 fastened by means of a head 48 to the floor 16. The head 48 is close to a first vertical rail 40. The jack 44 also comprises a rod 50 fastened with the aid of a head 52 to the lower surface of the armrest 8. As regards the head 52, it is close to the other vertical rail 40. When the rod 50 of the jack 44 enters and exits the body 46 of this jack 44, the armrest 8 moves down and up as indicated by the double arrow 54.

The jack 44 is, for example, a gas jack. Ratchet means (not depicted), for example, can be provided to maintain the armrest 8 in its two extreme positions. The jack 44, for example, prestresses the armrest in its high position. Then on releasing the ratchet and locking means from the high position and pressing on the armrest 8, the latter then slides along the rails 40 to reach its low position in which it is maintained by virtue of the corresponding ratchet means. In order then to raise the armrest 8, it suffices to release the ratchet means maintaining the armrest 8 in its low position. The jack 44 then pushes the armrest 8 toward its high position.

FIGS. 7 to 10 depict another embodiment of a mechanism making it possible to provide for translation of the armrest 8.

In this second embodiment, there also are two vertical rails 60. These rails extend from the floor and both are arranged in a more or less vertical plane. The armrest 8 has on a lateral surface 62 two sleeves 64 each intended to accommodate a rail 60. Each sleeve 64 is in the form of a tubular piece with rectangular inner section, of a shape complementary to that of the rails 60. The sleeves 64 are arranged on the lateral surface 62 so that they can be slipped onto these rails 60. The distance separating these two sleeves 64 therefore corresponds to the distance separating the two corresponding vertical rails. Thus the sleeves 64 provide for guiding of the armrest 8 in a vertical translatory movement from the bottom upwards or vice versa.

In FIG. 7, the armrest 8 is shown in its high raised position. In order to limit the upward travel, at the top of the rails 60 a stop 66, for example, is provided in each instance. At the end of travel, the sleeves 64 then come to butt against the stops 66, thus limiting the movement of the armrest 8. FIG. 8 shows the armrest 8 in an intermediate position. Here also, ball bearings, arranged in the sleeves 64, may be provided in order to facilitate the movement of the armrest 8 in relation to the rails 60.

FIG. 9 shows the armrest 8 in its lowered position. Limitation of the travel of the armrest toward the floor 16 may be provided for by various means. In the scenario depicted in the drawing, these limitation means are deemed to be arranged at the springs 68 depicted schematically on either side of the rails 60 and mounted between the lower surface of the armrest 8 and the floor 16.

As emerges from the drawing, it is noted that the sleeves 64 project from the lower surface of the armrest 8. It then also can be provided that the downward travel of the armrest 8 is limited by these sleeves 64, when the latter come to touch the floor 16.

In this second embodiment, there also can be provided ratchet means (not depicted) making it possible to maintain the armrest 8 in its high position, as well as ratchet means (not depicted) for maintaining the armrest 8 in its low position. The functioning of the armrest then is similar to the functioning described with reference to the first embodiment of FIGS. 5 and 6.

The jack 44 of FIG. 5 and the springs of FIGS. 7 to 9 could be replaced by any other means known to the individual skilled in the trade. An electric motor could be provided, for example, arranged between the floor 16 and the armrest 8. Other means, of course, can be considered: rack system, scissors joint, etc. . . .

The technical solution proposed here makes it possible to enlarge the bedding surface for the passenger, as emerges in particular from FIG. 4. The mechanisms described with reference to FIGS. 5 to 10 preferably are set up so that the upper surface of the armrest is flush with the more or less horizontal surface of the seat beside the armrests 8. This more or less horizontal surface corresponds to the bedding surface of the seat and is formed, in the example of implementation depicted in the drawing, by the back 4 and the additional berth 32. The passenger using this berth thus enjoys an increased width at the shoulders.

With a view to saving space, particularly in width, it is provided (cf. FIGS. 1 to 4) that the right armrest, that is, the one located on the side of opening 12, is in the extension of the wall 10. It also can be provided to integrate the armrest into this wall 10. A hollow portion in the wall 10 then is provided beside the sitting portion 2, on either side of this sitting portion, this hollow portion serving as housing for the armrest 8 and for its functioning mechanism.

The armrests proposed here are armrests that can be entirely independent of the seat with which they are associated. As a matter of fact, it is noted in the preceding description that the armrests are mounted sliding on rails fastened to the floor of the aircraft cabin. The whole formed by the actual armrest and its means for guiding and movement can be independent of the actual seat. A variation of implementation not depicted also, of course, can provide that an armrest of a seat according to the invention is mounted on the seat itself. With a seat such as described above, the guiding rails for the armrests could be mounted on the frame of the seat or else be integral with the sitting portion of this seat.

The individual skilled in the trade readily understands that with a seat according to the invention, for a given width, the comfort of the passenger is appreciably increased. Thus with a seat width comparable to that of seats currently found on aircraft intended for the transportation of passengers in business-class compartments, a comfort similar to that offered to first-class passengers can be obtained.

The armrests, in their lowered and retracted position, do not limit the width of the bedding surface of the passenger occupying the seat converted into a bed. They even can come to enlarge the bedding surface when they happen to be flush therewith. All this makes it possible to increase passenger comfort even further.

It also is possible to provide that the armrests can be retracted so as not to limit the width of the sitting portion when the seat is in its so-called seated position. In this case, the armrests can move down until they are flush with the surface of the sitting portion of the seat or else below this sitting surface.

This invention is not limited to the embodiments described above by way of non-limitative examples. It also relates to all the variations of implementation within the reach of the individual skilled in the trade within the context of the claims below.

The invention claimed is:

1. A seat for an aircraft, comprising:
    a sitting portion with a sitting surface,
    a back portion with a back surface, and
    two armrests,
    wherein said seat is convertible into a bed, and further comprises
    a guide mechanism with at least two substantially vertical rails that guide at least one armrest in a translatory movement in a substantially vertical direction, wherein said guide mechanism guides said at least one armrest between an initial position in which a top surface of said at least one armrest projects above the sitting surface of the sitting portion and a second retracted position in which said top surface of said at least one armrest is substantially flush with a substantially horizontal surface of a portion adjacent to the at least one armrest or is below said substantially horizontal surface, and
    a lateral wall surrounding a rear of the seat,
    wherein said at least one armrest is an extension of the wall.

2. A seat according to claim 1, wherein said bed is convertible from a sitting position, in which said back portion is inclined with respect to said sitting surface, into a bed position, in which said back portion is substantially horizontal, and wherein in said bed position and in said second retracted position, the top surface of said at least one armrest is substantially horizontal and flush with the back surface.

3. A seat according to claim 2, wherein said sitting portion is fixed so as to be in a same position in both said sitting position and in said bed position, and said back portion shifts from said sitting position to said bed position so as to entirely cover said sitting portion in said bed position.

4. A seat according to claim 1, wherein, in said second retracted position, said top portion of the at least one armrest is substantially flush with the sitting surface of the sitting portion or is below said sitting surface.

5. A seat according to claim 1, wherein said bed is convertible from a sitting position, in which said back portion is inclined with respect to said sitting surface, into a bed position, in which said back portion is substantially horizontal, and wherein said guide mechanism guides the at least one armrest independently of the back portion such that said at least one armrest is movable back and forth between said initial position and said retracted position in both said sitting position and in said bed position.

6. A seat according to claim 1, wherein said at least one armrest comprises means for locking said at least one armrest in said initial position.

7. A seat according to claim 6, further comprising prestressing means for exerting a force on the at least one armrest, wherein said force tends to restore said at least one armrest to said initial position.

8. A seat according to claim 7, further comprising means for locking the at least one armrest in said retracted position.

9. An aircraft for passenger transportation, comprising at least one seat according to claim 1.

10. A seat according to claim 1, wherein, in said second retracted position, said top surface of said at least one armrest is substantially flush with the substantially horizontal sitting surface of said sitting portion.

11. A seat according to claim 1, wherein, in said second retracted position, said top surface of said at least one armrest is below said sitting surface.

12. A seat for an aircraft, comprising:
a sitting portion with a sitting surface,
a back portion with a back surface, and
two armrests,
wherein said seat is convertible into a bed, and further comprises
a guide mechanism with at least two substantially vertical rails that guide at least one armrest in a translatory movement in a substantially vertical direction, wherein said guide mechanism guides said at least one armrest between an initial position in which a top surface of said at least one armrest projects above the sitting surface of the sitting portion and a second retracted position in which said top surface of said at least one armrest is substantially flush with a substantially horizontal surface of a portion adjacent to the at least one armrest or is below said substantially horizontal surface, wherein said bed is convertible from a sitting position, in which said back portion is inclined with respect to said sitting surface, into a bed position, in which said back portion is substantially horizontal, wherein in said bed position and in said second retracted position, the top surface of said at least one armrest is substantially horizontal and flush with the back surface, and wherein, in said bed position, said back portion is over said sitting portion such that in said second retracted position, said top surface of said at least one armrest is above said sitting portion.

13. A seat according to claim 1, wherein said seat is convertible from a sitting position, in which said back portion is inclined with respect to said sitting surface, into a bed position, in which said back portion is substantially horizontal, and wherein, in said bed position and in said second retracted position, the top surface of said at least one armrest is below said back surface.

14. A seat for an aircraft, comprising:
a sitting portion with a sitting surface,
a back portion with a back surface, and
two armrests,
wherein said seat is convertible into a bed, and further comprises
a guide mechanism with at least two substantially vertical rails that guide at least one armrest in a translatory movement in a substantially vertical direction, wherein said guide mechanism guides said at least one armrest between an initial position in which a top surface of said at least one armrest projects above the sitting surface of the sitting portion and a second retracted position in which said top surface of said at least one armrest is substantially flush with a substantially horizontal surface of a portion adjacent to the at least one armrest or is below said substantially horizontal surface, wherein said guide mechanism includes at least one jack that prestresses said armrest in said initial position, wherein said jack has a first end to be fastened to a floor of said aircraft and a second end fastened to said at least one armrest.

15. A seat according to claim 14, wherein said guide mechanism includes a single jack with said second end fastened to a lower surface of said at least one armrest.

16. A seat according to claim 15, wherein said single jack is positioned at an angle relative to a vertical axis.

17. A seat according to claim 14, wherein said guide mechanism includes at least two vertical jacks that prestress said armrest in said initial position, wherein each jack has a sleeve that receives one of said rails, wherein said sleeves project downward below a lower surface of said at least one armrest so as to limit a downward movement of said at least one armrest by touching said floor of said aircraft when said at least one armrest reaches said retracted position.

* * * * *